US008300294B2

(12) United States Patent
Wu et al.

(10) Patent No.: US 8,300,294 B2
(45) Date of Patent: Oct. 30, 2012

(54) PLANAR GRADIENT INDEX OPTICAL METAMATERIALS

(75) Inventors: Zhuoyuan Wu, Houghton, MI (US); Serdar H. Yonak, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 496 days.

(21) Appl. No.: 12/562,440

(22) Filed: Sep. 18, 2009

(65) Prior Publication Data

US 2011/0069377 A1    Mar. 24, 2011

(51) Int. Cl.
*G02F 1/01* (2006.01)
(52) U.S. Cl. ....................................... 359/240
(58) Field of Classification Search .................. 359/240
See application file for complete search history.

(56) References Cited

U.S. PATENT DOCUMENTS 7,561,320 B2    7/2009    Wang et al.

OTHER PUBLICATIONS

Shuang Zhang, Wenjun Fan, N.C. Panoiu, K.J. Malloy, R.M. Osgood, and S.R.J Brueck, Experimental Demonstration of Near-Infrared Negative-Index Metamaterials, PRL 95, 137404 (2005).*
Anatoliy O. Pinchuk, George C. Schatz, Focusing a beam of light with left-handed metamaterials, Solid-State Electronics 51 (2007) 1381-1386.*
Kim, Dongho, Choi, Jaeick, Novel Planar Metamaterial with a Negative Refractive Index, *ETRI Journal*, vol. 31, No. 2, pp. 225-227, Apr. 2009.
Shalaev, V.M., "Optical negative-index metamaterials," School of Electrical and Computer Engineering and Birck Nanotechnology Center, Purdue University, West Lafayette, Indiana 47907, USA, 2006, posted online at http://docs.lib.purdue.edu/nanopub/32.
Smolev, S., Brueck, Steven R.J., "Graded Index Optical Lens Using Inhomogeneous Metamaterials," CLEO/QELS 2008, San Jose, CA, May 4-9, 2008.
Wu, Q., Gibbons, John M., and Park, Woungjhang, "Graded negative index lens by photonic crystals," Optics Express, vol. 16, No. 21, Oct. 8, 2008.
Nguyen, V.N., et al., "Electrically coupled graded index metamaterial," Proceedings of iWAT 2008, Chiba, Japan, Mar. 4-6, 2008.

* cited by examiner

*Primary Examiner* — Stephone Allen
*Assistant Examiner* — Kimberly N Kakalec
(74) *Attorney, Agent, or Firm* — Gifford, Krass, Sprinkle, Anderson & Citkowski, P.C.

(57) ABSTRACT

An apparatus comprises a metamaterial including a first conducting layer, a second conducting layer, and a dielectric layer located between the first conducting layer and the second conducting layer. Each conducting layer has holes formed therethrough, for example as an array of holes formed through the metamaterial. The holes are configured so that the metamaterial has a gradient refractive index at an operational wavelength. The operational wavelength may be an IR or visible wavelength. The apparatus may be an optical element, and for example may have the functionality of a lens or prism through the gradient refractive index. Interfaces may be parallel planar interfaces.

15 Claims, 9 Drawing Sheets

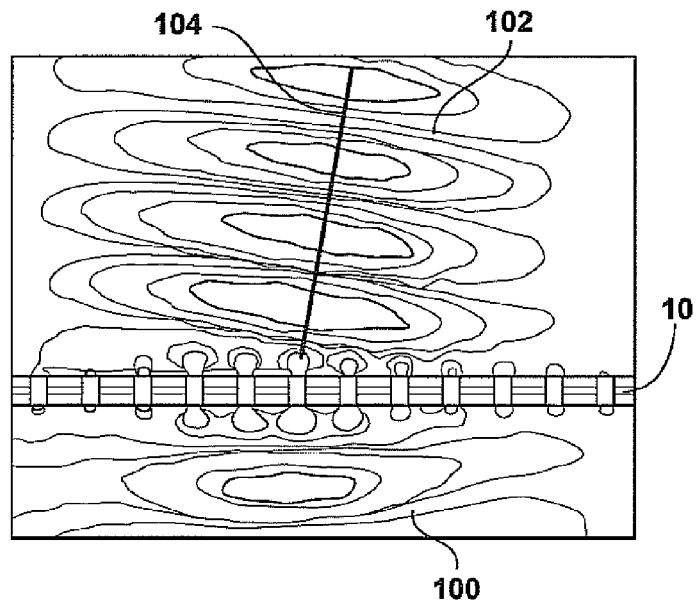
FIG. 7
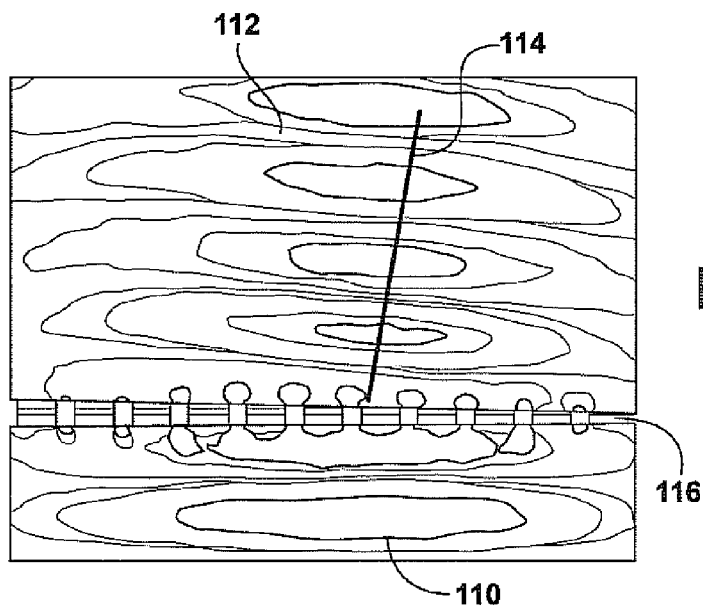
FIG. 8A
FIG. 8B
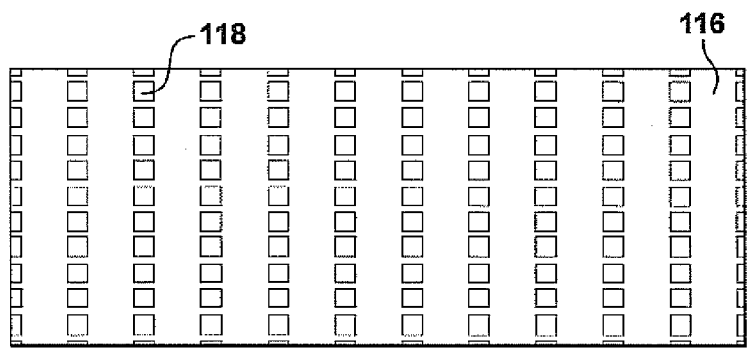

US 8,300,294 B2

PLANAR GRADIENT INDEX OPTICAL METAMATERIALS

FIELD OF THE INVENTION

The invention relates to metamaterials, in particular to gradient index metamaterials.

BACKGROUND OF THE INVENTION

Metamaterials are artificial composite materials. A uniform metamaterial may be formed as a repeated unit cell structure, the unit cell dimensions typically being somewhat less than the operational wavelength. For example, the operating wavelength may be at least three times the unit cell parameter, and may be at least 5 times the unit cell parameter. The electromagnetic properties of the metamaterial, such as permittivity, permeability, and refractive index, can be calculated using an effective median theory.

An interesting aspect of metamaterials is that electromagnetic properties not available in naturally occurring materials can be obtained. In particular, negative index materials, for example having a negative refractive index, can be created.

For radar applications, a unit cell may comprise a metal foil pattern fabricated using conventional printed circuit board techniques. However, limitations on lithography restrict the use of such circuit board based approaches to longer wavelength applications, such as radar. Most previous applications of metamaterials have been radar applications.

However, there is a great need for improved optical components.

SUMMARY OF THE INVENTION

Examples of the present invention include metamaterials operational at optical frequencies, where this term is used to refer to visible and IR wavelengths. The metamaterials have a gradient refractive index, the refractive index varying as a position of spatial position on the metamaterial. The term "gradient index metamaterial" will be used to describe metamaterials having a spatially varying refractive index.

An example metamaterial comprises a multilayer structure including at least a pair of conducting layers having a pattern (such as an array) of holes (apertures) disposed therein. The conducting layers may be generally parallel and separated by a dielectric layer. Holes may extend continuously through conducting and dielectric layers, or may be formed in conducting layers alone. A metamaterial may include conducting layers having a fishnet structure. A fishnet structure can be viewed as comprising electrically conducting stripes in a crossing pattern, so as to define the pattern of holes (or apertures). A multilayer may comprise alternating conducting and dielectric layers, for example to increase the optical depth of the lens.

In some examples, the holes are centered on a regular array, for example the holes having a center arranged on a rectangular or square grid. However, one or more size parameters of the holes may vary with position. In some examples, the holes may be generally rectangular and have a side length that varies along one or more directions. The cross-sectional area of each hole (hole area) may vary as a function of position in one or more directions.

In other examples, the holes are arranged in an array, but the array is not a regular array in that hole spacing varies over the metamaterial. In other words, the distance between hole centers is a function of position along one or more predetermined directions. In these examples, the holes may have a similar size over the metamaterial, and the variation in hole spacing provides the index gradient.

An example apparatus, such as an optical element, comprises a metamaterial including a first conducting layer, a second conducting layer, and a dielectric layer located between the first conducting layer and the second conducting layer, each conducting layer having holes formed therethrough. The holes are configured so that the metamaterial has a gradient refractive index at an operational wavelength. The operational wavelength may be an IR or visible wavelength. Holes may be formed as an array of holes extending through the metamaterial.

The holes may have a size parameter that varies as a function of position along at least one direction through the metamaterial, for example a direction in the plane of a conducting layer. The size parameter may be a side length of a polygon (such as a square, rectangle, or other polygon), hole diameter (for example, of a circular hole or the major or minor diameter of an ellipse), or other measurement correlated with hole area or form. The holes may be formed in a regular array, and the size parameter may change along a principal direction of the array.

Alternatively, or in addition, the holes may have a hole spacing that varies as a function of position along at least one direction through the metamaterial. In some examples, the hole spacing may be measured as the distance between hole centers along a given direction. The holes may be disposed in an irregular array, the array parameters (such as spacing) changing as a function of position.

The gradient refractive index may be a gradient positive refractive index.

A metamaterial may comprise a plurality of alternating conducting layers and dielectric layers. Additionally, index matching layers may be introduced, so as to reduce reflective losses at the interface. At a particular position, the index matching layers may have a refractive index between that of the nearest part of the metamaterial and that of an exterior medium, such as air.

Example apparatus include a metamaterial lens, radiation being refracted by the gradient refractive index within the metamaterial structure. The index gradient may be a linear, quadratic, parabolic, or other function of position, for example as a function of distance from a lens center or lens edge. Examples of the present invention also include imaging devices, such as cameras, using such optical elements. Examples of the present invention also include beam redirection devices, projection devices, beam handling devices such as optical routers, and the like.

A metamaterial may have a structure comprising a repeated unit cell structure, the unit cell having an edge length between approximately 100 nanometers and approximately 1,000 nanometers.

BRIEF DESCRIPTION OF THE DRAWINGS

FIG. 7 is a top view of a multilayer structure used as a gradient metamaterial element;

FIG. 8A-8C show an electromagnetic response from a metamaterial nanoprism;

DETAILED DESCRIPTION OF THE INVENTION

An example metamaterial comprises a multilayer structure including an array of holes. Each hole has a size parameter, such as the side length of a square, rectangle, or other polygon, diameter, or other measurement of spatial extent.

The size parameter may vary as a function of position within the metamaterial, for example along a predetermined direction, so as to impart a spatially varying value on refractive index or other electromagnetic parameter. The size parameter may be somewhat less than the optical wavelength, for example the side length of a rectangular hole may be less than one-third, more particularly less than one-fifth, of the optical wavelength at which the metamaterial operates.

Example metamaterials may be operable in the optical regime. In this context the optical regime may includes both infrared and visible wavelengths. In some examples, the operational wavelength of a metamaterial may be a visible wavelength, for example a wavelength between 350 nm and 750 nm. In some examples, the operational wavelength may be a visible or near-IR wavelength, for example a wavelength between 350 nm and 5 microns, more particularly between 400 nm and 3 microns.

The multilayer may include at least one pair of adjacent dielectric and electrically conducting layers. For example, a conducting layer may be sandwiched between two dielectric layers, or vice versa. A multilayer may comprise alternating layers of an electric insulator and a conducting material.

Examples include a multilayer metal (or other conducting layer)/dielectric slab. The hole pattern of the structure allows the metamaterial to be described as a fishnet structure. In the fishnet structure, the magnetic response may originate from the anti-parallel current supported by the wire pairs. Hence, a metamaterial may include a pair of spaced apart conducting layers separated by a dielectric layer. The holes of the conducting fishnet layers may be in alignment, and holes may extend through the dielectric layer(s) as well.

A conducting layer may comprise a metal, semiconductor, conducting polymer, or other conducting material.

The dielectric layer may comprise an electrical insulator such as an inorganic oxide, other non-conducting material, glass, insulating polymer, and the like. The multilayer structure includes a plurality of holes, being apertures formed through some or all layers of the multilayer structure. For example, holes may be formed in at least one conducting layer. Holes may extend fully through the multilayer and be air filled, or in other examples, holes may be formed in a conducting layer and filled with a dielectric material, in part or entirely.

Figure 1A:
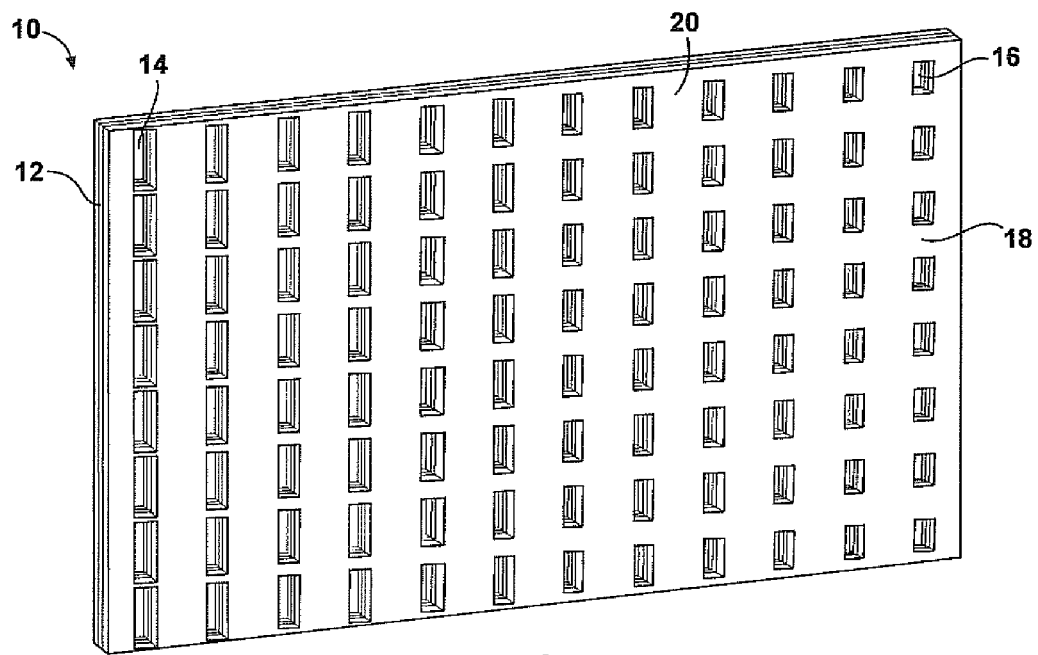
FIG. 1A shows an example metamaterial comprising a multilayer having an array of holes formed therethrough.

FIG. 1A shows an example metamaterial 10 comprising a multilayer 12 having an array of holes formed therethrough. In this example, the holes are rectangular having a vertical side length that varies as a function of horizontal position. For example, hole 14 near the left edge has a greater vertical side length than the hole 16 near the right edge. In this example, holes are formed as a regular array, as the hole centers are arranged in a regular array.

In this context, terms such as "vertical", "horizontal", "left", and "right" are used in relation to the illustration, and are not limiting.

Figure 1D:
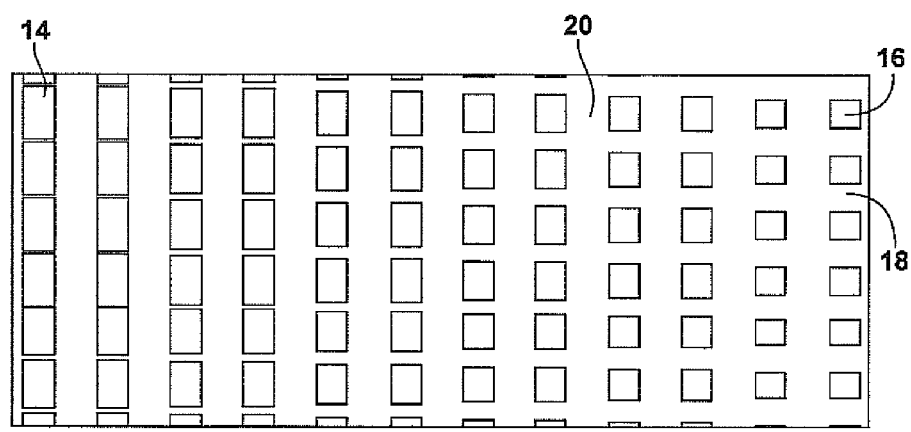
FIG. 1D is a top view of the structure, further illustrating the hole pattern.
Figure 1C:
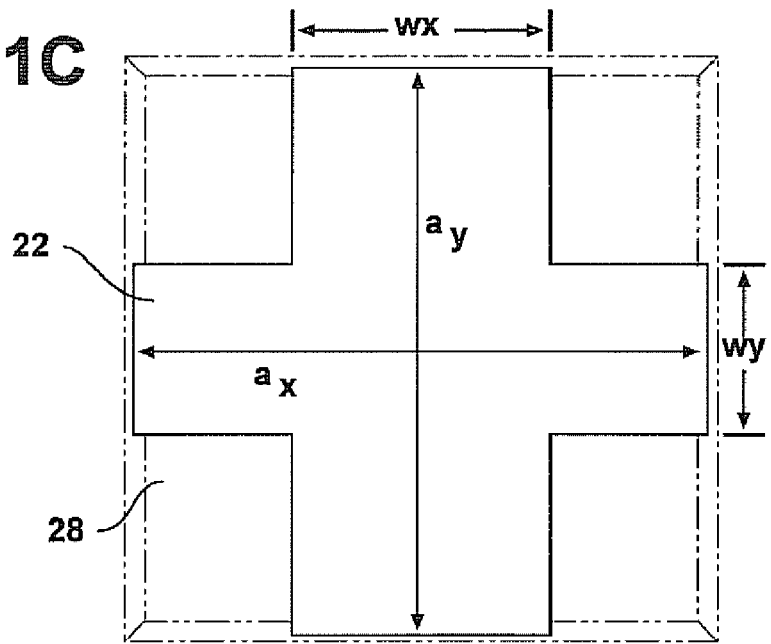
FIG. 1C is a top view of a unit cell, illustrating unit cell directions.
Figure 1B:
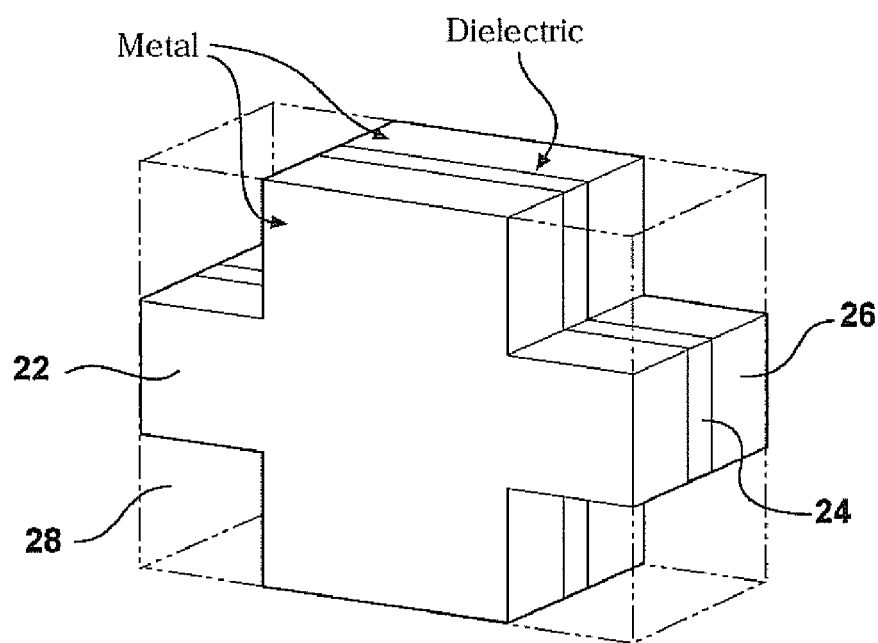
FIG. 1B further illustrates the multilayer, including a dielectric layer sandwiched between two metal layers.

FIG. 1B shows a unit cell of the structure shown in FIG. 1A. In a uniform metamaterial, the structure is formed by repeating the same unit cell in horizontal and vertical directions. In contrast, in this example gradient metamaterial, a parameter of the unit cell varies in at least one direction. In this representative example, the width of the horizontal stripes indicated at wy varies as a function of position X along the horizontal direction.

FIG. 1B illustrates the multilayer as including a dielectric layer 24 sandwiched between two metal layers 22 and 26. The unit cell is selected to include one-quarter each of four surrounding holes, for example hole portion 28.

FIG. 1C is a top view of a unit cell, illustrating unit cell dimensions ay and ax in vertical and horizontal directions respectively. In some examples, ay=ax, and only the symbol A is used. The figure also shows stripe widths wx and wy in vertical and horizontal directions respectively. The terms vertical and horizontal refer to the illustration, and are not limiting.

This top view shows a generally plus symbol (+) shaped metal conductor, with the corners of the unit cell being portions of holes such as 28.

FIG. 1D is a top view of the structure, further illustrating the hole pattern, showing holes 14 and 16 within multilayer 12. For a regular square array, as shown in FIG. 1C, ay is equal to ax, the side lengths of the unit cell being equal. For a uniform metamaterial formed by repeating the unit cell shown in FIG. 1C, holes would have a dimension height by width, denoted C×D, where C=ay−wy and D=ax−wx. Hence, as the horizontal stripe width increases going from left to right as shown in FIG. 1A, the vertical hole dimension decreases. In this example, the unit cell dimensions ay and ax are constant, and the hole dimensions change as a function of position. Further, the unit cell dimensions (periodicity) a is similar to the hole center spacing along that direction.

In this example, the holes are generally rectangular so that the stripe width wy increments in a stepped pattern as the vertical stripes are crossed going from left to right as illustrated in FIG. 1A.

FIGS. 1A-1D illustrate that the structure can be described either in terms of an array of holes within the multilayer, or alternatively described as a structure formed from intersecting vertical and horizontal stripes. In the example of FIG. 1A, the vertical stripes have a constant width progressing from left to right. However, the horizontal stripes are wider on the right than on the left. In this way, the vertical side length of the holes varies as a function of position, the hole 14 having a greater vertical side length than the hole 16. FIG. 1A shows a vertical stripe labeled 20 extending downward through the structure, and horizontal stripe 18 which extends horizontally being appreciably narrower on the left than on the right. In some examples, vertical and horizontal stripes may both vary as a function of position. The variation in stripe width may be continuous or in a stepped manner.

In other example metamaterials, the stripe widths may have a thickness that is constant over the extent of the metamaterials. The gradient index may arise entirely or largely from variations in the size parameters of the unit cell.

Figure 2:
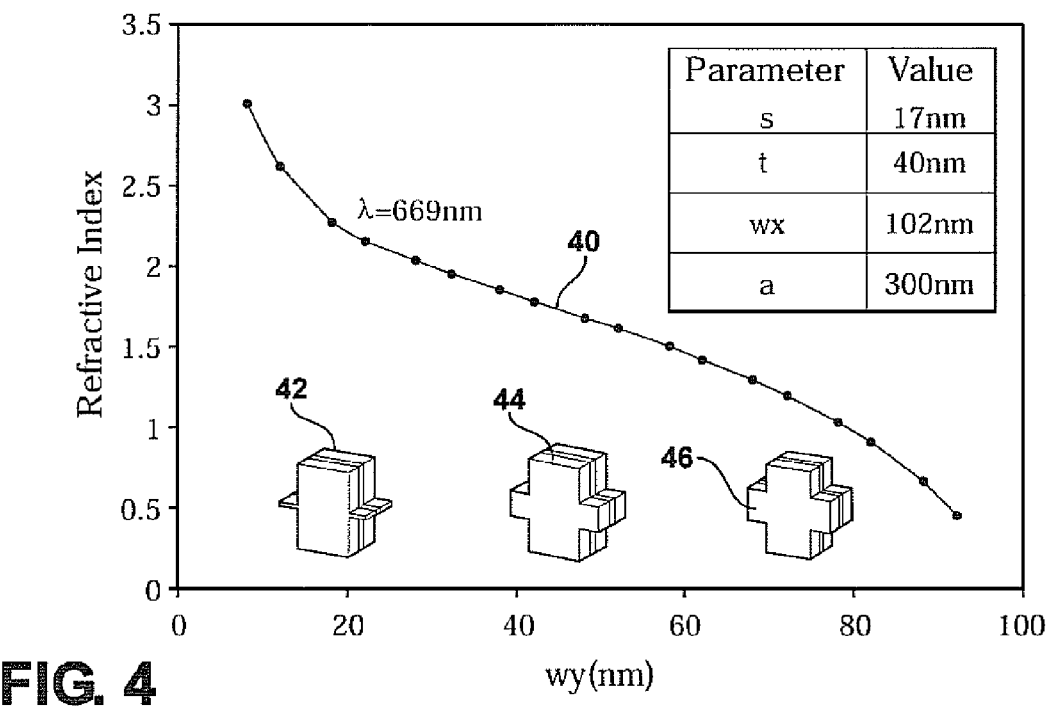
FIG. 2 shows refractive index as a function of horizontal stripe width.

FIG. 2 shows refractive index as a function of horizontal stripe width wy. The index curve 40 is shown for a wavelength of 669 nanometers. The curve is obtained using simulations. The inset figures 42, 44 and 46 are illustrations of how the unit cell appearance changes with the horizontal stripe width variation. As can be seen, in 42 the horizontal stripe is narrow, whereas in 46 the horizontal stripe is relatively broad. In this example the vertical stripe width wx is constant. The simulation parameters were dielectric layer thickness s=17 nanometers, metal layer thickness t=10 nanometers, vertical stripe thickness wx=102 nanometers, and unit cell dimension a=300 nanometers. In this example, unit cell spacing was the same in horizontal and vertical directions, i.e. on a regular square array.

The refractive index curve 40 is positive over the entire range of stripe thickness. Examples of the present material include metamaterials having a refractive index gradient at a visible or other optical wavelength, the refractive index being at least in part a positive index, and in some examples the refractive index is positive over the entire metamaterial.

If a single unit cell configuration is repeated over the entire metamaterial, the result would be a uniform metamaterial with the refractive index calculated for that configuration. By varying the size parameter as a function of spatial position, the refractive index gradient can be obtained.

Referring to FIG. 1A, this illustration is not necessarily to scale. There may be many more unit cells across the extent of the metamaterial, and the gradient in size parameter may be more gradual from unit cell to unit cell than illustrated. The refractive index gradient may be generally continuous at a wavelength distance scale, and stepped at the smaller distance scale of the unit cell.

The index gradient may be linear or curved, as desired. The refractive index curve shown in FIG. 2 can be used to determine the required variation in size parameter to obtain the desired spatial variation in refractive index.

Figure 3:
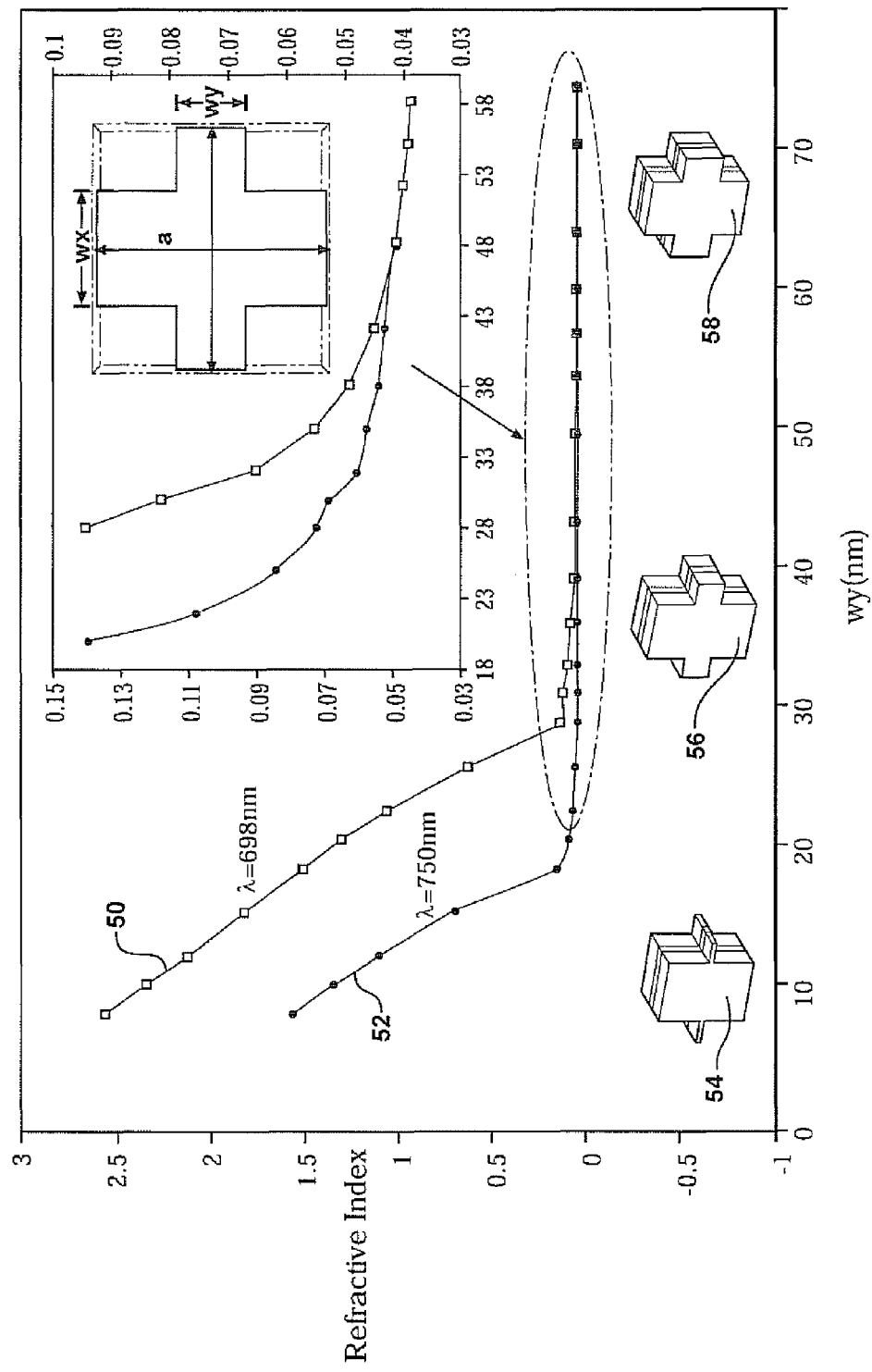
FIG. 3 shows refractive index versus stripe width.

FIG. 3 shows refractive index versus wy curves for two wavelengths, 698 nanometers (curve 50) and 750 nanometers (curve 52). Again, inset diagrams such as 54 illustrate the variation in unit cell geometry corresponding to the change in horizontal stripe thickness along the ordinate axis.

The 750 nanometer curve shows little variation with wy for wy between approximately 20 nanometers and 35 nanometers. This region of the curve is shown in expanded portion within the inset.

For this simulation, the metal layer was silver as this metal has low loss at optical frequencies. The dielectric material chosen was magnesium fluoride, but many other equivalent dielectric materials may be used. The lattice constant of the unit cell was a=175 nanometers, wx=102 nanometers, t=40 nanometers, and s=17 nanometers.

Figure 4:
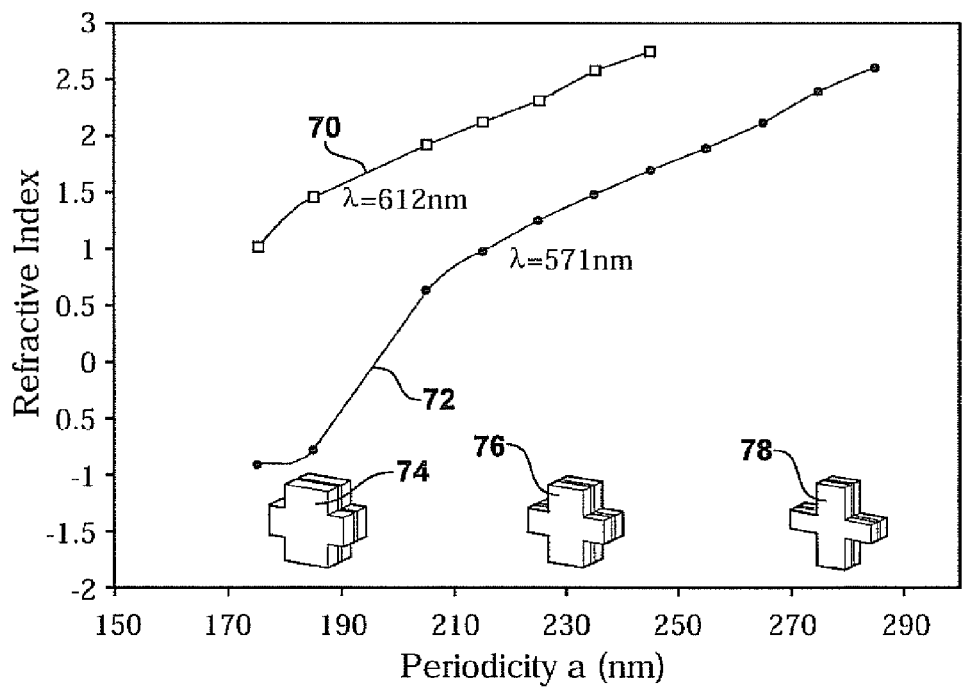
FIG. 4 shows refractive index as a function of periodicity (hole spacing)

FIG. 4 shows refractive index as a function of periodicity A, which may also be termed the lattice constant and closely correlates with hole spacing. The figure shows curves at 612 nanometers (curve 70) and 570 nanometers (curve 72). The inset diagrams 74, 76 and 78 show the variation in unit cell geometry. In this simulation, wx=102 nanometers and wy=68 nanometers. These values are kept constant. The refractive index is a function of the periodicity a.

Figure 5:
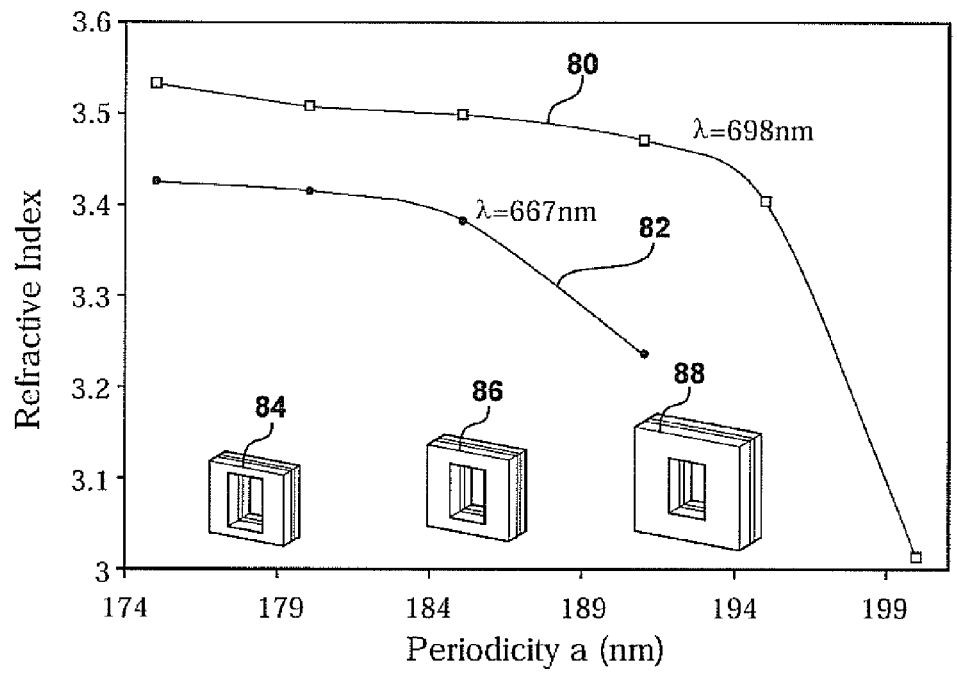
FIG. 5 illustrates the variation of refractive index with periodicity for a fixed hole size.

FIG. 5 illustrates the variation of refractive index with periodicity a for a fixed hole size. The figure shows a curve 80 for 698 nanometers and curve 82 for 667 nanometers. The inset figures 84, 86 and 88 show the representations of the unit cell. The hole size is fixed with a vertical side length of 232 nanometers and a width of 198 nanometers. In this example, the index variation is provided by the change in the side length of the unit cell, which may also be referred to as the lattice constant or periodicity.

Figure 6:
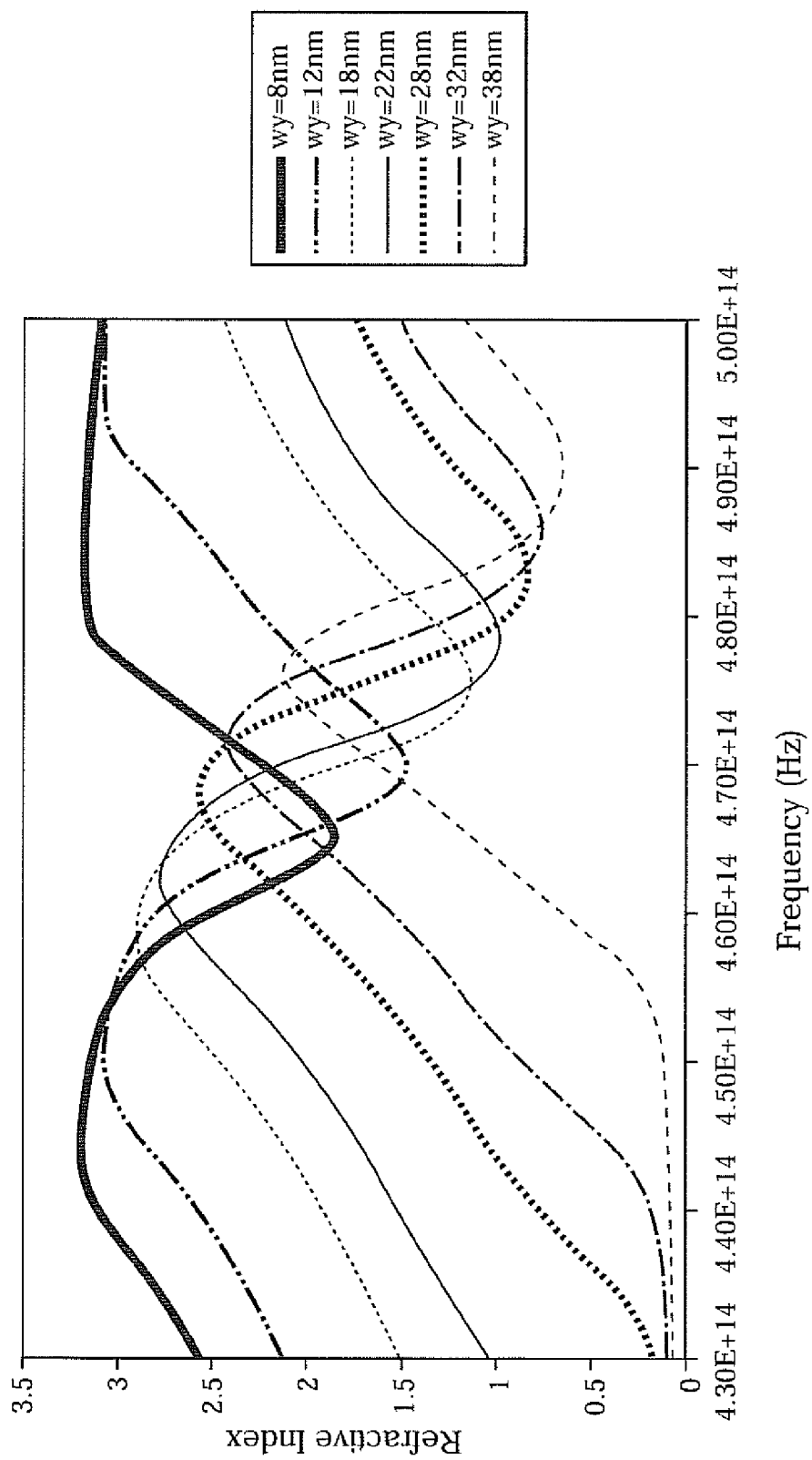
FIG. 6 shows refractive index versus optical frequency as a function of stripe width.

FIG. 6 shows refractive index versus optical frequency as a function of wy, for the geometry discussed in relation to FIG. 3. For certain structures, the refractive index may go through one or more turning points, giving especially complicated behavior close to resonance. However, the geometry may be chosen to give a uniform gradient of refractive index versus frequency (dispersion) for the desired operating region. In many examples, it may be advantageous to operate the metamaterial well away from resonance to reduce losses. Previous metamaterials have often been operated close to resonance in order to obtain negative refractive index. However, the possible advantages of negative refractive index may be outweighed by the problems of losses close to resonance. Hence, in examples of the present invention, the metamaterial may be obtained to give a positive refractive index at the desired operating frequency.

FIG. 7 is a top view of a structure 10, such as shown in FIG. 1A, used as a gradient metamaterial element. The element 10 receives an input beam of radiation 100 from below, as illustrated in the simulation. The output beam is deviated as a result of the index profile within the element 10. The line 104 is provided to guide the eye. However, it can be clearly seen that the wavefronts of the output beam 102 are angled with respect to the metamaterial element 10, and also with respect to the wavefronts of the input beam 100.

The top view shows a metamaterial 10 comprising a dielectric layer sandwiched between two metal layers, which is discussed in more detail above in relation to FIGS. 1A and 1B. The structure has holes therethrough. As illustrated, the hole spacing and hole width is uniform. The other side length varies as a function of position across the metamaterial. Comparing this view with FIG. 1C, wx is uniform across the metamaterial and the top view is downwards along the Y direction. Hence, variations in wy are not visible within this view. However, these variations provide the index variations.

Simulations were also performed of a similarly gradient hole pattern in a uniform slab. In this control experiment no deviation of the input beam was observed. Furthermore, simulations were run with no variation in hole dimensions across the metamaterial. In the example of a uniform metamaterial slab, again no deviation of the input beam was observed.

The electromagnetic properties of the metamaterial 10, as illustrated in FIG. 7, simulate those of a dielectric wedge.

FIG. 8A shows a similar electromagnetic response from a metamaterial nanoprism 116. FIG. 8A shows an input beam 110 deviated in a proximate direction 114 within the output beam 112. FIG. 8B is a top view of the metamaterial nanoprism showing a uniform hole distribution.

Figure 8C:
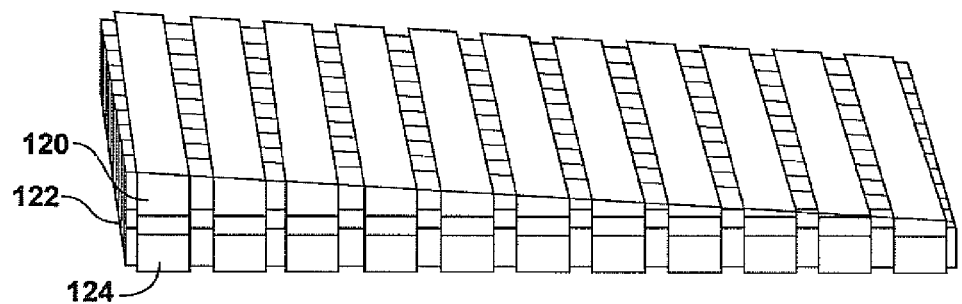

FIG. 8C is a side view of the nanoprism showing a gradient in metal layer thickness 112, the dielectric layer 122 and second metal layer 124 remain in constant thickness. However, fabrication of the device shown in FIG. 8C may present practical difficulties. The metamaterials according to the present invention, such as illustrated in FIG. 1, allow the behavior of a nanoprism to be obtained solely through variations in hole parameters.

Simulations

Simulations were performed using CST Microwave Studio. This was used to determine S-parameters of the metamaterials. A Matlab code was used to extract impedance and indexes from the S-parameters.

Figure 9:
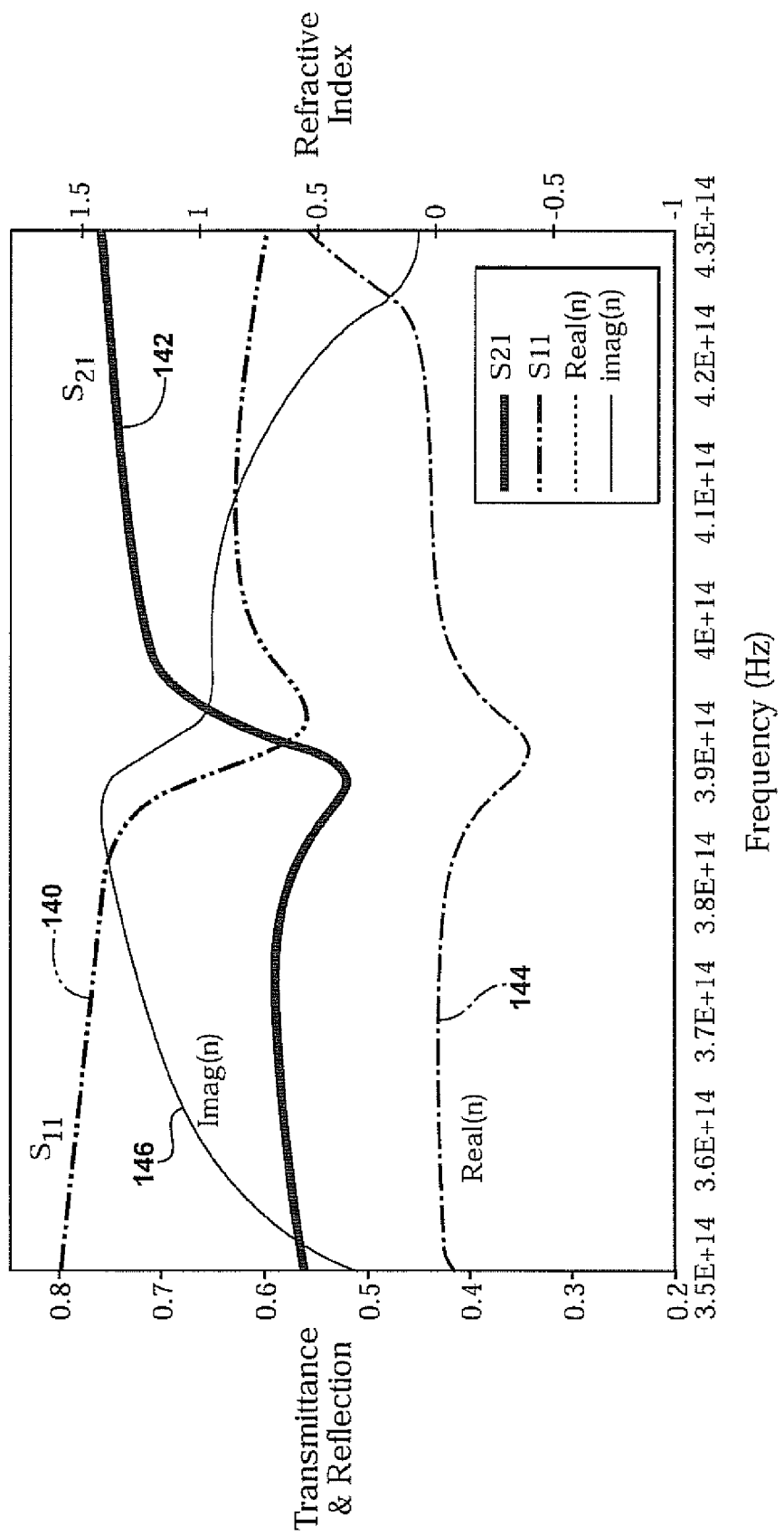
FIG. 9 shows metamaterial S-parameters obtained from CST simulations, and refractive index values derived from the S-parameters.

FIG. 9 shows S-parameters obtained from CST simulations (curves 140 and 142), and real and imaginary refractive index values (curves 144 and 146, respectively) obtained from the S-parameters using a Matlab algorithm.

The CST simulations were found to be more efficient than finite element (HFSS) simulations. The CST simulations gave transmission and reflection coefficients, and also allowed the two-dimensional electric field mapping shown in FIGS. 7 and 8A.

In the examples above, a square array was used in which the periodicity a is the same in vertical and horizontal directions. However, this is not necessarily used, and the lattice constant may be different in vertical and horizontal directions.

Figure 10:
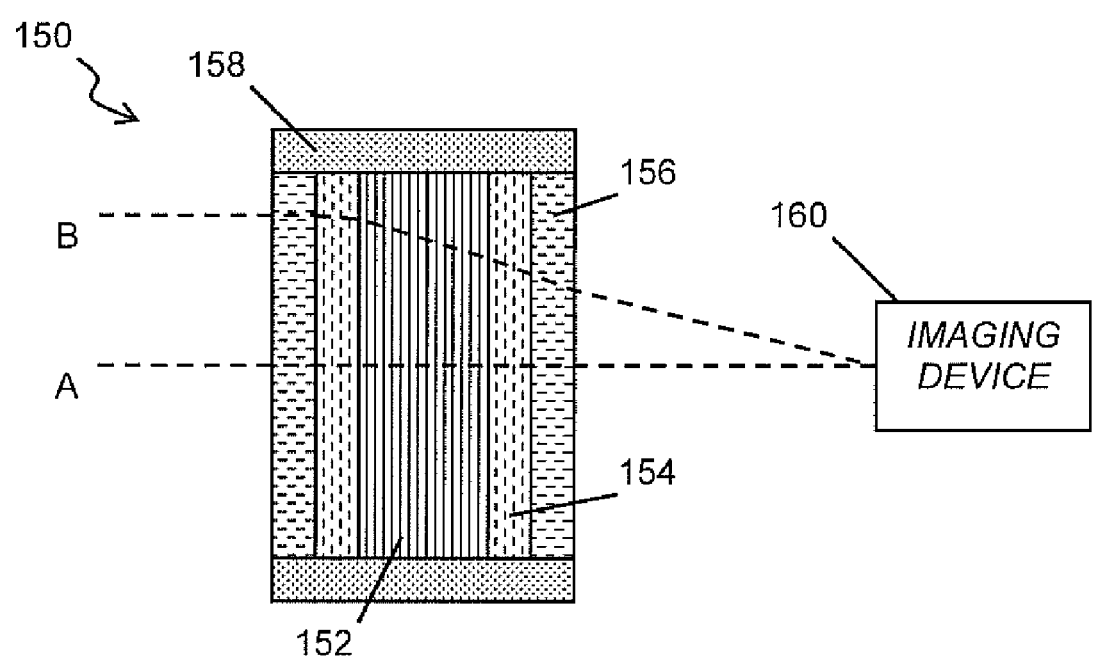
FIG. 10 shows an optical element in the form of an imaging lens.

FIG. 10 shows an optical element in the form of an imaging lens 150. The figure shows the lens comprising multi-layer gradient index metamaterial 152, matching layers 154 adjacent each face, protection layer 156, and edge seal 158. The lens is shown focusing axial radiation (dashed line A) and off-axis radiation (dashed line B) onto imaging device 160. The metamaterial lens has no curved surfaces, and may be much thinner than conventional glass lenses. The optional protection layer may be a dielectric layer, such as a polymer, ceramic, or glass layer, and may be a thin scratch resistant layer. The index matching layers introduce a gradient index along the direction of propagation of the axial beam (A), to reduce interface reflections from the metamaterial. The index matching layers can be fabricated in the same manner as the gradient index metamaterial, and may be part of the same unitary structure. The protection layer may be an outer layer of the matching layer structure. The edge seal 158 may be a polymer, ceramic, or other material. The illustration is a cross-section, and the optical element 150 may be circular, square, rectangular, or other form. For example, the lens may be circular, the index profile may be designed as a function of radial distance from the lens center, and the edge seal may be a generally ring-shaped structure bonded to the edge of the metamaterial, and may be used to hermetically seal the lens structure.

Fabrication

Optical metamaterials may be fabricated at a sub-wavelength scale of approximately 50 nanometers to 1,000 nanometers. Example fabrication approaches include electron beam evaporation, which can be used to produce multilayer metal dielectric stacks. In some examples, a focused ion beam system can be used to fabricate metamaterials in the form of multilayers, milling spot sizes in the order of a few nanometers or greater.

The unit cell size of the structure may be in the range of 100 nanometers to 1,000 nanometers, allowing operation in visible and IR frequency ranges. An optimization design cycle can be used to design gradient index metamaterials.

Holes may be generally square or rectangular, but in fabricated samples may have rounded corners as a consequence of the fabrication method, for example the corner radius may be related to the spot size of an ion beam.

Examples of the present invention include planar designs that do not require a volumetric unit cell. The structure has a relatively simple cross section which can be fabricated by many techniques. Any conventional semiconductor or ceramic fabrication method can be adapted for use to make the described structures.

An edge protection layer may be bonded to the multilayer material, for example by wafer bonding methods. An optical element may be encapsulated by an exterior dielectric or ceramic protection layer, for example as a dry stack within a hermetically sealed container.

Reducing the deposition rate of the metal films may be used to obtain higher quality metal surfaces and a lower loss. Field emission scanning electron microscopy can be used to determine hole sizes of experimentally fabricated devices.

Devices may be fabricated with the dielectric and conducting layer thicknesses and size parameter of the holes each being less than the operational wavelength. For example, the dielectric layer thickness may be in the range 1 nm-500 nm, more particularly 2 nm-100 nm; the conducting layer thickness may be in the range 1 nm-500 nm; more particularly 2 nm-50 nm, and the unit cell dimension may be in the range 30 nm-3000 nm, more particularly 50 nm-1000 nm.

Conducting layers may be a metal (such as gold, silver, platinum, aluminum, and the like), a conducting polymer, conducting organic, or other material. The dielectric layer may comprise an inorganic dielectric (such as an oxide, fluoride, nitride, carbide, and the like), non-conducting polymer, ceramic, glass, air, nitrogen, inert gas, or other material.

Applications

Examples of the present invention include planar gradient index metamaterials that can deflect infrared and visible light beams. Various known nanofabrication techniques can be used. Applications include gradient index lenses. The lenses may have a planar gradient refractive index.

Examples further include negative index metamaterials. However, the examples described above provided a gradient of positive refractive index. Applications further include zero index materials, reversed Doppler effects, super lenses, optical tunneling devices, compact resonators, dynamically adjustable metamaterials, cloaking devices, and highly directional sources.

Examples further include IR and/or visible imaging, for example for use in automotive systems. An example apparatus is an IR vision system including a planar gradient metamaterial lens operational at the IR frequency. Example applications include automotive imaging applications, such as pedestrian detection and other hazard detection systems, time-of-flight sensing systems, and night vision systems.

A planar gradient index metamaterial design can be used to deflect a light beam. The function of the device is comparable to that of a metamaterial nanoprism, but presents several advantages, such as a planar structure without the need for curved surfaces.

An index gradient may have linear, parabolic, polynomial, or other dependence on a distance parameter, such as distance along a predetermined direction. The index gradient may include a general parabolic (or other) form, summed with a correction function selected to reduce aberrations. In some examples, an optical element may have regions of different index gradient forms and an intermediate blended region, for example to obtain a gradient bifocal lens, for example having far focusing and near focusing regions, and a gradient region between them. In some examples, the index gradient may include two or more functions, for example two parabolic dependencies. The optical element function may vary as a function of radiation direction onto the lens, or radiation origin within the field of view.

An imaging device may be configured to work well with any anisotropies introduced by anisotropic hole configurations.

Example devices also include projection devices, including optical projectors, laser systems, fiber optic launching optics, and the like.

Continuously gradient index structures provide advantages over conventional metamaterials with homogeneous or step index profiles. In some examples, a perfect lens can be obtained using a gradient index negative metamaterial. A gradient and refractive index can be introduced by continuous tuning of one or more parameters of the metamaterial elements.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. An apparatus, the apparatus comprising a metamaterial including:
   a first conducting layer;
   a second conducting layer; and
   a dielectric layer located between the first conducting layer and the second conducting layer,
   each conducting layer having holes formed therethrough,
   the holes being configured so that the metamaterial has a gradient refractive index at an operational wavelength,
   the gradient refractive index varying as a function of spatial position on the metamaterial,
   the holes having a hole spacing that varies as a function of position along at least one direction, the hole spacing being a hole center spacing,
   the gradient refractive index being a gradient positive refractive index,
   the operational wavelength being an IR or visible wavelength.

2. The apparatus of claim 1, the holes having a size parameter that varies as a function of position along at least one direction through the metamaterial.

3. The apparatus of claim 2, the size parameter being a side length or diameter of the holes.

4. The apparatus of claim 1, the holes being formed as an array of holes extending through the metamaterial.

5. The apparatus of claim 1, wherein the operational wavelength is an IR wavelength.

6. The apparatus of claim 1, wherein the operational wavelength is a visible wavelength.

7. The apparatus of claim 1, the apparatus comprising alternating conducting layers and dielectric layers.

8. The apparatus of claim 1, the apparatus being a lens, radiation being refracted by the gradient refractive index.

9. The apparatus of claim 8, the apparatus being an optical imaging apparatus.

10. The apparatus of claim 1, the metamaterial having a structure comprising a repeated unit cell, the unit cell having a periodicity of between approximately 100 nanometers and approximately 1,000 nanometers.

11. An apparatus comprising a metamaterial, the metamaterial including:
    a first conducting layer;
    a second conducting layer; and
    a dielectric layer located between the first conducting layer and the second conducting layer,
    the metamaterial having a regular array of holes extending through the metamaterial,
    the holes having a size parameter that varies as a function of position on the metamaterial,
so that the metamaterial has a gradient refractive index at an operational wavelength,
    the gradient refractive index varying as a function of spatial position on the metamaterial,
    the gradient refractive index being a gradient real positive refractive index,
    the operational wavelength being an IR or visible wavelength.

12. The apparatus of claim 11, the operational wavelength being a near-IR or visible wavelength.

13. The apparatus of claim 11, the metamaterial structure comprising a repeated unit cell structure,
    the unit cell having an edge length in the range of 100 nanometers to 1,000 nanometers.

14. An apparatus comprising a metamaterial, the metamaterial including:
    a first conducting layer;
    a second conducting layer; and
    a dielectric layer located between the first conducting layer and the second conducting layer,
    the metamaterial having an array of holes extending through the metamaterial,
    the holes having a hole spacing that varies as a function of position on the metamaterial, so that the metamaterial has a gradient refractive index at an operational wavelength,
    the gradient refractive index varying as a function of spatial position on the metamaterial,
    the gradient refractive index being a gradient real positive refractive index,
    the operational wavelength being an IR or visible wavelength.

15. The apparatus of claim 14, the operational wavelength being a near-IR or visible wavelength.

* * * * *

UNITED STATES PATENT AND TRADEMARK OFFICE
CERTIFICATE OF CORRECTION

| | |
|---|---|
| PATENT NO. | : 8,300,294 B2 |
| APPLICATION NO. | : 12/562440 |
| DATED | : October 30, 2012 |
| INVENTOR(S) | : Wu et al. |

It is certified that error appears in the above-identified patent and that said Letters Patent is hereby corrected as shown below:

In the Specification

Column 4, line 25, please delete "A" and insert --a--.

Signed and Sealed this
Eleventh Day of November, 2014

Michelle K. Lee
*Deputy Director of the United States Patent and Trademark Office*